(12) United States Patent
Colalancia et al.

(10) Patent No.: US 7,523,046 B2
(45) Date of Patent: Apr. 21, 2009

(54) COMMUNICATION SYSTEM FOR MANAGING HOTEL OPERATIONS

(75) Inventors: Marco S. Colalancia, Parker, CO (US); Jon S. Miller, Parker, CO (US)

(73) Assignee: CartManager, LLC, Parker, CO (US)

( * ) Notice: Subject to any disclaimer, the term of this patent is extended or adjusted under 35 U.S.C. 154(b) by 1137 days.

(21) Appl. No.: 10/205,912

(22) Filed: Jul. 26, 2002

(65) Prior Publication Data
US 2004/0019513 A1    Jan. 29, 2004

(51) Int. Cl.
*G06F 9/46*    (2006.01)
(52) U.S. Cl. .......................................................... 705/9
(58) Field of Classification Search ........................ None
See application file for complete search history.

(56) References Cited

U.S. PATENT DOCUMENTS

| | | | | |
|---|---|---|---|---|
| 3,214,747 | A | | 10/1965 | Lurie .......................... 340/286 |
| 3,675,204 | A | | 7/1972 | Miehle et al. ................ 340/147 |
| 3,754,227 | A | * | 8/1973 | Andersson ............. 340/286.08 |
| 3,797,009 | A | * | 3/1974 | Crudgington, Jr. ...... 340/286.08 |
| 3,819,862 | A | * | 6/1974 | Hedges ..................... 379/93.37 |
| 3,944,742 | A | | 3/1976 | Cunningham ................. 178/66 |
| 4,072,825 | A | * | 2/1978 | McLay et al. .................. 379/33 |
| 4,360,828 | A | | 11/1982 | Briggs, Jr. et al. ............. 358/86 |
| 4,392,132 | A | * | 7/1983 | Derks ....................... 340/825.2 |
| 4,994,908 | A | * | 2/1991 | Kuban et al. ................... 725/83 |
| 5,821,513 | A | * | 10/1998 | O'Hagan et al. ............. 235/383 |
| 5,842,181 | A | * | 11/1998 | Fanjoy .......................... 705/32 |
| 5,926,799 | A | * | 7/1999 | Robinson ..................... 705/28 |
| 5,963,911 | A | * | 10/1999 | Walker et al. ................... 705/9 |
| 5,969,678 | A | | 10/1999 | Stewart ....................... 342/457 |
| 6,144,943 | A | * | 11/2000 | Minder ........................ 705/11 |
| 6,633,900 | B1 | * | 10/2003 | Khalessi et al. ............. 709/202 |

(Continued)

FOREIGN PATENT DOCUMENTS

GB    1 536 534      12/1978

(Continued)

OTHER PUBLICATIONS

Palm Hospitality Technologies, Inc. http://web.archive.org/web/20010802205030l/www.palm-ht.com, Aug. 2, 2001, p. 1-6.*

(Continued)

*Primary Examiner*—Scott L Jarrett
(74) *Attorney, Agent, or Firm*—Sheridan Ross P.C.

(57) ABSTRACT

A system and method are provided for managing hotel operations through a wireless communications network. A central computer includes software for organizing and prioritizing data regarding desired room usage based upon input from arriving hotel guests. The data is organized into shift orders which take into account particular hotel guests needs. The shift orders are transmitted wirelessly to mobile units in the hotel mounted to housekeeping carts. Housekeeping personnel respond to tasks or orders which appear on the screens of the mobile units. The mobile units are also used to wirelessly transmit back to the central computer the status of the work being completed, as well as to advise the central computer as to changing conditions encountered by the housekeeping personnel. The central computer continually updates shift orders, prioritizes assignments to the particular mobile units, and therefore enhances communications directly between the needs of the guests and housekeeping personnel.

13 Claims, 9 Drawing Sheets

U.S. PATENT DOCUMENTS

| | | | | |
|---|---|---|---|---|
| 2001/0007982 | A1* | 7/2001 | Brown | 705/28 |
| 2001/0042001 | A1* | 11/2001 | Goto et al. | 705/9 |
| 2001/0047391 | A1* | 11/2001 | Szutu | 709/206 |
| 2001/0047427 | A1* | 11/2001 | Lansio et al. | 709/238 |
| 2002/0010615 | A1* | 1/2002 | Jacobs | 705/9 |

FOREIGN PATENT DOCUMENTS

| | | | |
|---|---|---|---|
| JP | 8287146 | * | 11/1996 |
| JP | 713782 | * | 5/1999 |
| WO | WO 98/58476 | * | 12/1998 |

OTHER PUBLICATIONS

Edmunds, Marian. "Your Wish is on my database: Custoemr Relationship Management: Digital technology is helping hotel chains to offer customized pampering," Financial Time. London Feb. 28, 2000 p. 19 (p. 1-2 of printout).*

Dube et al. "Best Practices in the U.S. Lodging Industry: Overview, Methods and Champions," Cornell Hotel and Restaurant Adminstration Quarterly, 1999.*

Siguaw et al. Best Practices in Information Technology, Cornell Hotel and Restaurant Administration Quarterly, 1999.*

Thompson, Gary M., Controlling Action Times in Daily Workforce Schedules Cornell Hotel and Restaurant Administration Quarterly, vol. 37, No. 2, Apr. 1996.*

PrimeTime F&S User's Guide version 1.3 Blue Pumpkin Software, 1997-1998.*

Inge, Jon, Invisible Technology Hotel & Motel Management, vol. 212, No. 14, Aug. 11, 1997.*

Greenman, Catherine, Opening Doors at a Hotel with a Palm in the Hand New York Times, Aug. 24, 2000.*

Berwin, Bob, Early Corporate Users Plan Pocket PC Pilots—Hotel operator will pit Palms against Microsoft's device Computerworld, vol., 24, No. 17, Apr. 23, 2000.*

Ismail, Ahmed, Front Office Operations and Management Thomson Delmar, 2002, ISBN: 0-7668-2342-1.*

Casado, Matt A., Housekeeping Management John Wiley & Sons, 2000, ISBN: 0-471-25189-5.*

Martin, Robert J., Professional Management of Housekeeping Operations—Third Edition John Wiley & Sons, 1998, ISBN: 0-471-19862-5.*

Wilson, Alister et al., Task-Unit Scheduling For Improved Service and Productivity Cornell Hotel and Restaurant Administration Quarterly, vol. 25, No. 2, Aug. 1984.*

Ameranth.com Web Pages Ameranth Technology Solutions, Feb. 2000, Retrieved from Archive.org Dec. 12, 2008.*

Selected pages of website for Resort Systems Inc. http://www:resortsystemsinc.com/index.html; printed on Dec. 6, 2001.

Selected pages of website for Hotel Software Systems, Ltd. http://www.hssltd.com/pcs/index.html; printed on Dec. 6, 2001.

Selected pages of website forCSS Hotel Systems http://www.csshotelsystems.com; printed on Dec. 6, 2001.

Selected pages of website for Guestline.com http://www.questline.com/homebig.htm; printed Dec. 6, 2001.

Selected pages of website for GuestWare—CRM Software for the Hotel Industry http://www.guestware.com/index.cfm; printed on Dec. 6, 2001.

Selected pages of website for Innsoft, Inc. Hotel Management Software http://www.innsoft.com/index.html; printed on Dec. 6, 2001.

Selected pages of website for MainStay—hotel systems and software from K-Computer http://www.k-computer.co.uk/htm/tech.htm; printed on Dec. 6, 2001.

Selected pages of website for Hotellinx Hotel Management Software http://www.sloweysys.com/hotlinx.htm; printed on Dec. 6, 2001.

Selected pages of website for ASA Lodging Management Software http://www.novacancy.com/; printed on Jan. 31, 2002.

Selected pages of website for InnQuest Software—Hotel software that's powerful, flexible, and easy-to-use http://www.innquest.com/; printed on Jan. 31, 2002.

Selected pages of website for Springer-Miller Systems—Home http://www.springermiller.com; printed on Jan. 31, 2002.

Selected pages of website for Realtime Computers—Encore Real Time Computing, Inc. http://www.encore.com/; printed Jan. 31, 2002.

Selected pages of website for MICROS Systems, Inc.—Fidelio http://www.micros.com/; printed on Jan. 31, 2002.

Selected pages of website for Hilton Worldwide http://www.hiltonworldwide.com/en/ww/index.jhtml?_requestid=7802; printed on Jan. 24, 2002.

Selected pages of website for Property Management Systems—PMS http://www.msisolutions.com/Product_Pages/PM.htm; printed on Jan. 24, 2002.

Selected pages of website for Hotel and Restaurant Software by Execu/Tech—Hotel / motel management http://www.execu-tech.com/index.html; printed on Jan. 24, 2002.

Selected pages of website for Remco Software, Hotel Software NiteVision SQL 2.0 Property Management System http://www.remcosoftware.com; printed on Jan. 24, 2002.

Selected pages of website for CENDANT: Abount CENDANT http://www.cendant.com/about-cendant/; printed on Jan. 17, 2002.

* cited by examiner

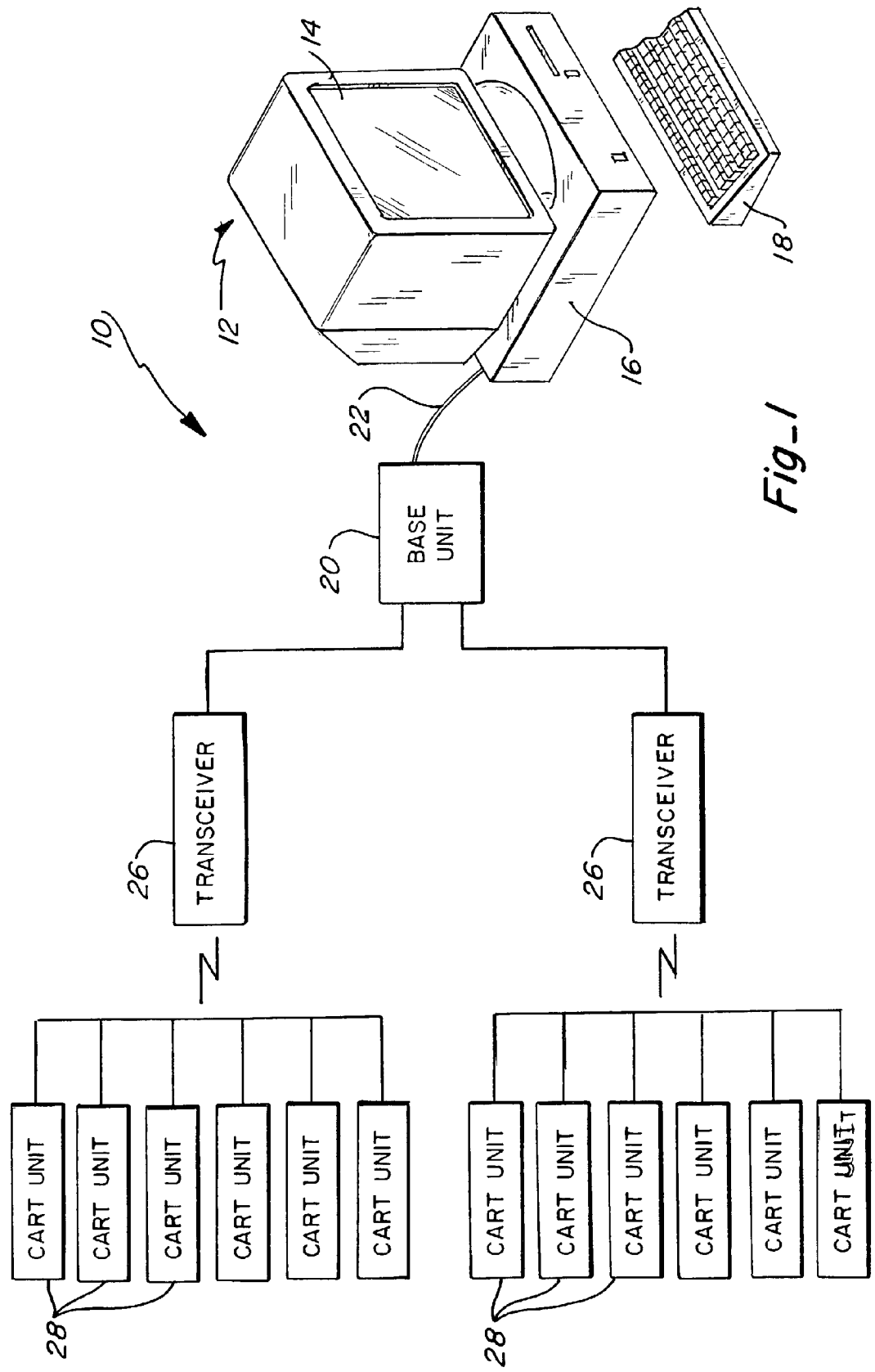
Fig_1

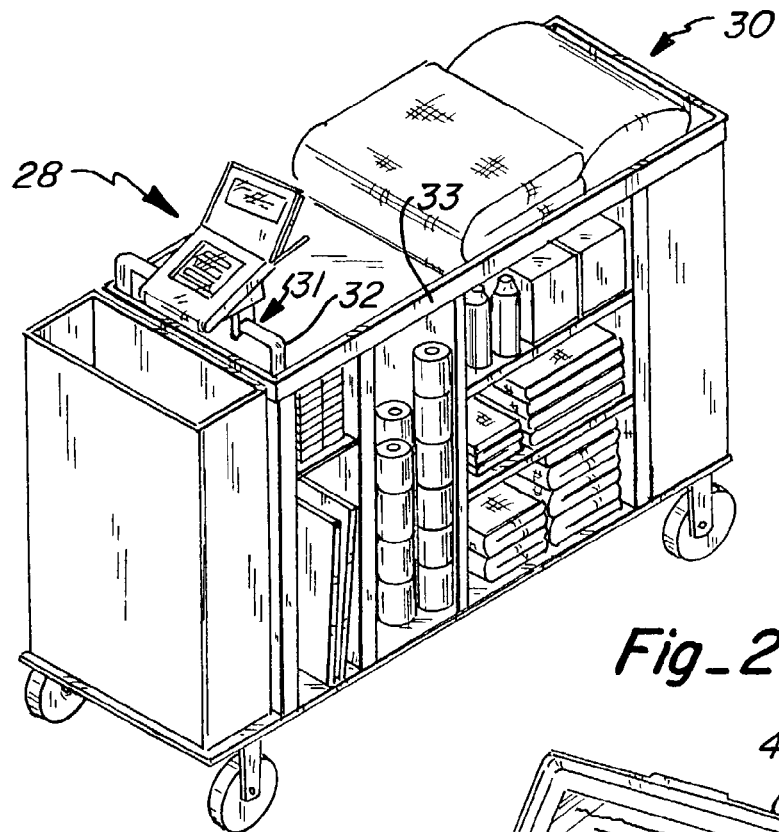
Fig_2
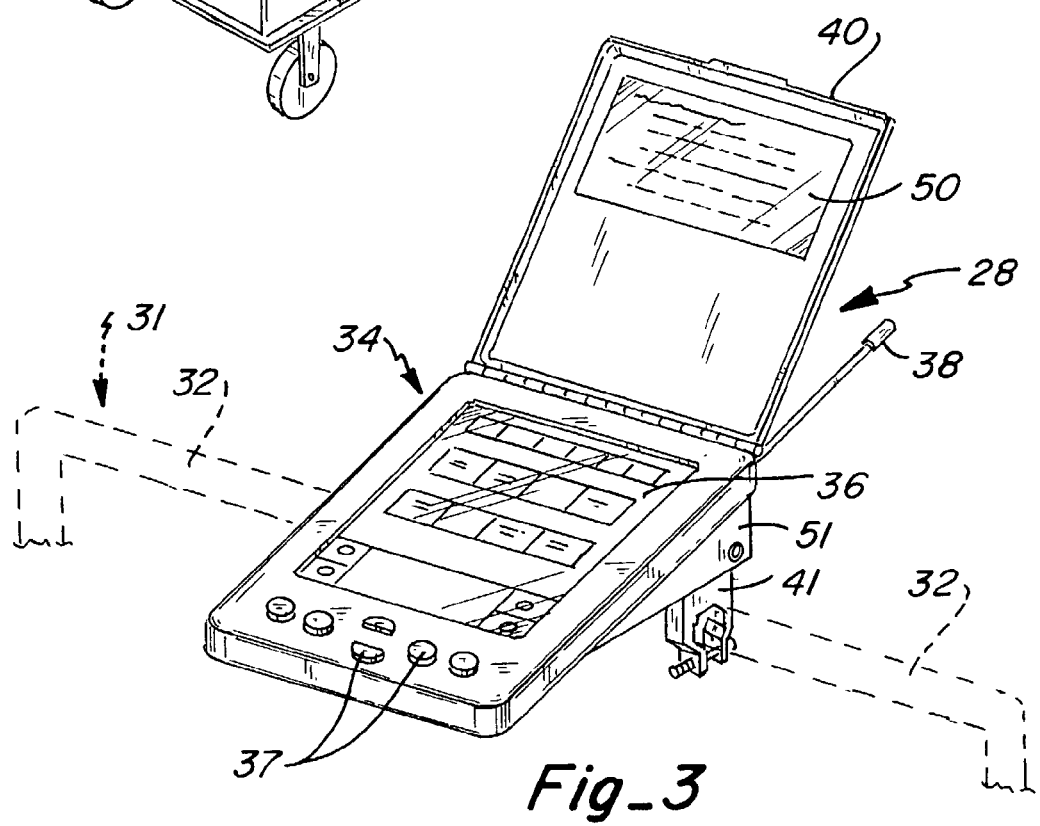
Fig_3

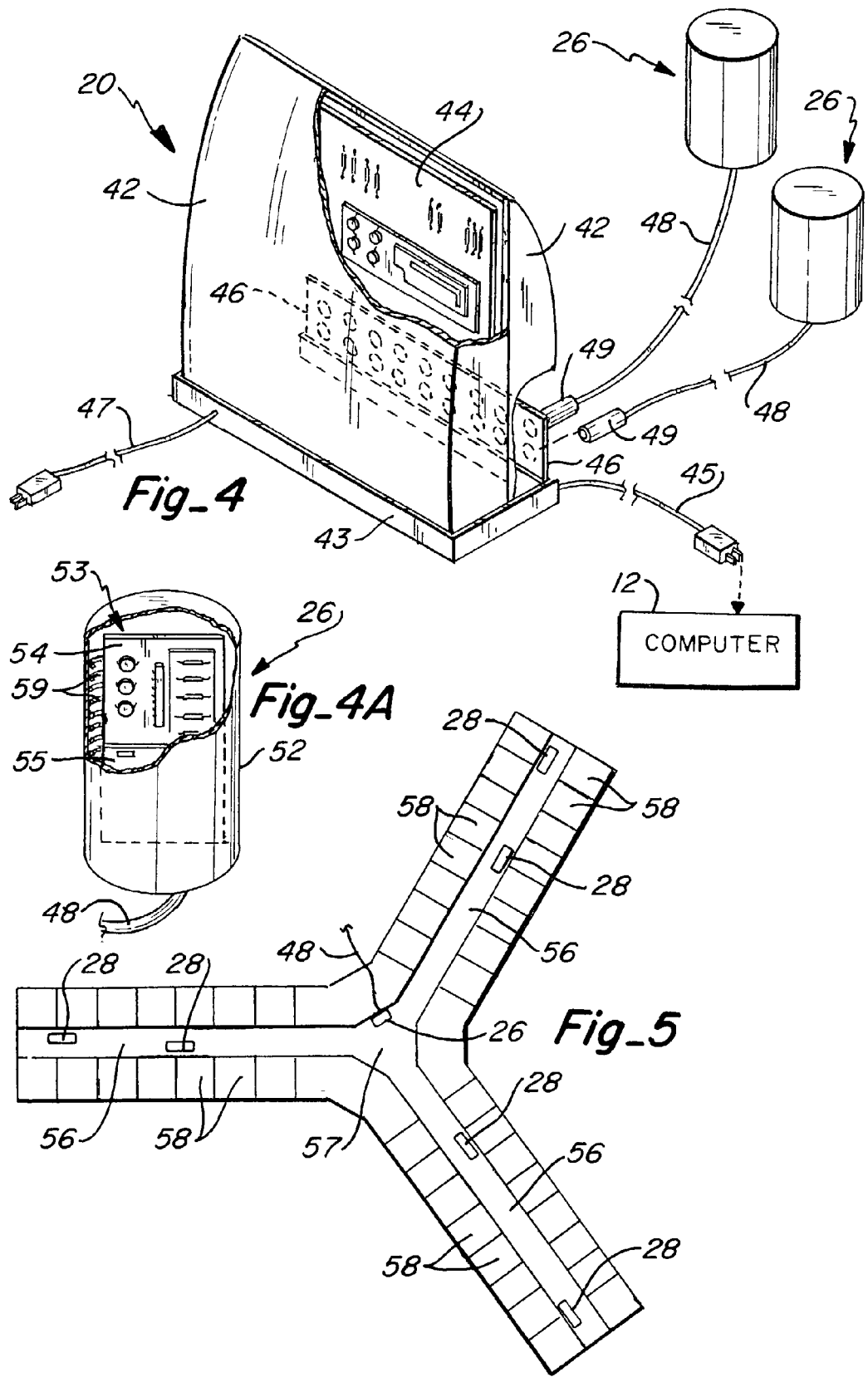

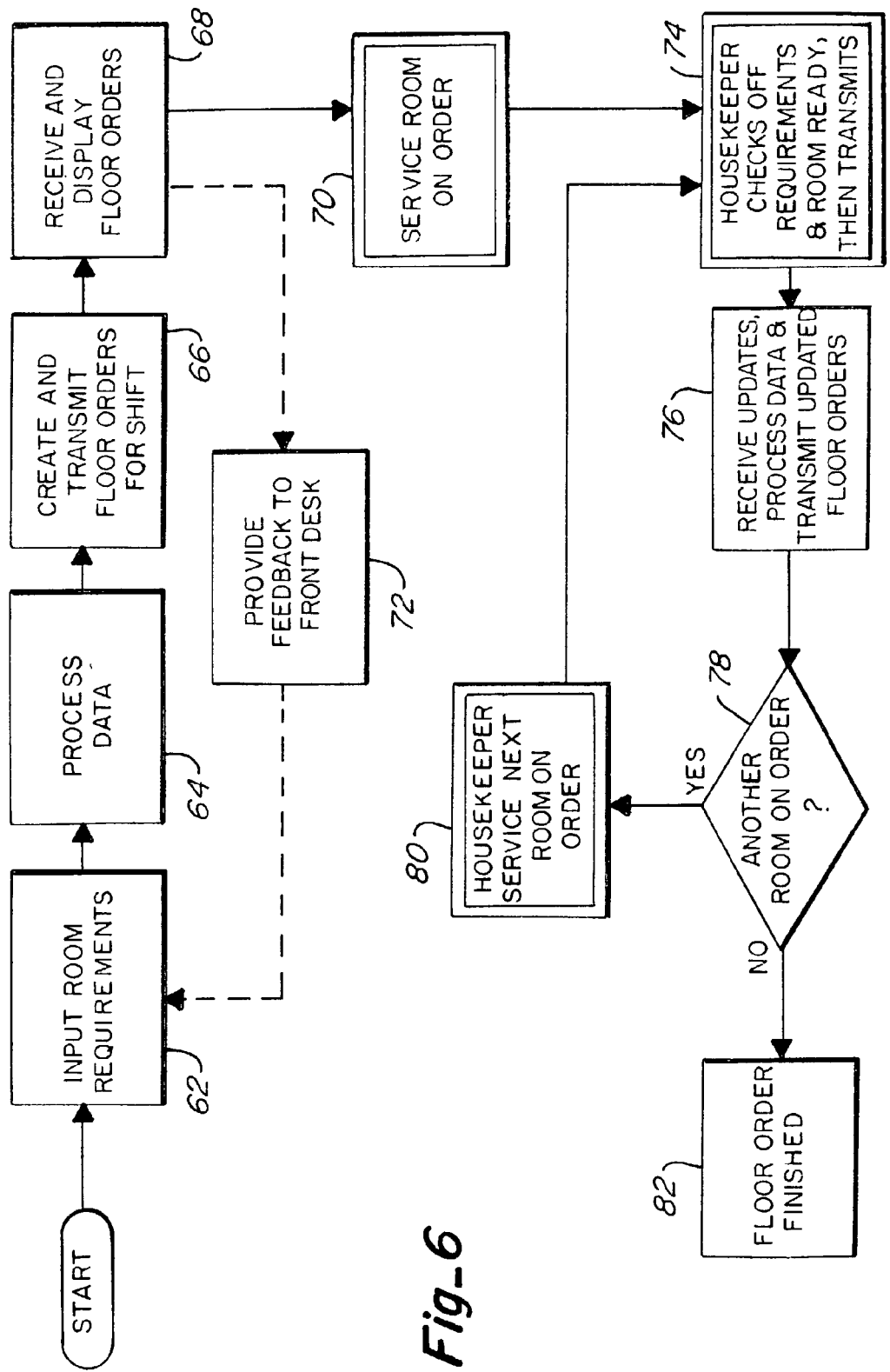
Fig_6

84

WELCOME TO CARTMANAGER.
WOULD YOU LIKE TO:
☒ ASSIGN AVAILABLE ROOMS
☐ TRAIN NEW USERS?
☐ CHANGE LANGUAGE?
☐ SEND INSTANT MESSAGES?
☐ PERFORM INVENTORY
   MANAGEMENT

AVAILABLE ROOM BY FLOOR:

| | △ |
|---|---|
| 3001 KING BED | |
| 3002 TWO DOUBLE BEDS | X |
| 3003 TWO DOUBLE BEDS | |
| 3004 SINGLE BED | |
| 3005 KING BED | |
| | ▽ |

☐ DONE ASSIGNING ROOMS

<u>3002 TWO DOUBLE BEDS</u>
TIME REQUIRED: [ ]
☐ EXTRA SOAP / SHAMPOO
☐ EXTRA TOWELS
☐ ROLL AWAY BED
☐ IRON
☐ OTHER _____
☐ DONE

*Fig. 9*

AVAILABLE ROOM BY FLOOR:

| |
|---|
| 3001 KING BED |
| 3003 TWO DOUBLE BEDS |
| 3004 SINGLE BED |
| 3005 KING BED |

☐ DONE ASSIGNING ROOMS

*Fig. 10*

| RM. ID: | TIME REQ. | SPEC REQ. |
|---|---|---|
| 3002 | 12:10 PM | EXTRA SOAP<br>EXTRA TOWE<br>IRON |
| 3011 | 12:40 PM | EXTRA SOAP<br>EXTRA TOWE |
| 3018 | 1:30 PM | EXTRA SOAP<br>IRON<br>OTHER: DO<br>NOT CLEAN |

☐ SEND FLOOR ORDERS TO CART UNIT ON WING 30XX

*Fig. 11*

ROOM ID: 3002  TIME REQ.  12:10 P
              TIME NOW   XX:XX:XX

SPECIAL REQUIREMENTS CHECK WHEN COMPLETE:

☐ EXTRA SOAP / SHAMPOO
☐ EXTRA TOWELS
☐ IRON
☐ ROOM READY

ROOM ID: 3011   TIME REQ.   12:40 PM
                TIME NOW    XX:XX:XX

SPECIAL REQUIREMENTS CHECK
WHEN COMPLETE:

☐ EXTRA SOAP / SHAMPOO
☐ EXTRA TOWELS
☐ ROOM READY

CHOOSE REPORTING PERIOD
☐ WEEKLY
☐ MONTHLY
☐ QUARTERLY
☐ SELECT STARTING DATE: ☐
            ENDING DATE: ☐

CHOOSE REPORT LAYOUT OPTION:
☐ ACCESS INVENTORY BY FLOOR
☐ ACCESS INVENTORY REPORTS
   BY CART UNIT

YOU'VE CHOSEN TO ACCESS YOUR
REPORT BY FLOOR.

CHOOSE FLOORS TO INCLUDE IN
REPORT:

ONE FLOOR, INPUT FLOOR NUMBER
HERE: ☐

MULTIPLE FLOORS, SEPARATE BY
COMMAS: ☐

YOU'VE CHOSEN TO ACCESS YOUR REPORT BY CART UNIT.

INPUT SELECTED CART UNIT(S). SEPARATE BY COMMA IF YOU WISH FOR A CUSTOMIZED REPORT ON MORE THAN ONE UNIT.

OR: [          ]

☐ RUN FULL INVENTORY REPORT BY CART UNIT.

OUTPUT OPTIONS:

PRINT A HARDCOPY OF YOUR REPORT

EMAIL THIS REPORT TO ANOTHER DEPARTMENT

[ PRINT ] [ EMAIL ]

STATUS OF ROOM: _____

☐ SCHEDULED FOR CLEANING
☐ CURRENTLY BEING CLEANED
☐ COMPLETED – READY FOR OCCUPANCY

COMMUNICATION SYSTEM FOR MANAGING HOTEL OPERATIONS

FIELD OF THE INVENTION

This invention relates to methods and systems for managing businesses, and more particularly, to a method and system for managing hotel operations including a wireless communication network for managing the servicing of rooms in a hotel.

BACKGROUND OF THE INVENTION

Hotel operations continue to become automated with time. Specifically, there are numerous types of hotel management software available for managing basic operations of a hotel to include check-in, money management, among other functions. Although hotels continue to incorporate automated systems, one continuing problem is the ability for a hotel to improve its efficiency in preparing and cleaning rooms for new guests. Typically, a new guest checks in at the hotel reception and then request a room. The receptionist/attendant checks to see room availability, and then assigns a room, assuming a room is available for the particular guest. If a room is not yet available, the guest must wait until one becomes available. For the great the majority of all hotels, there is a standard check-in time which allows housekeeping personnel to prepare and clean rooms for arriving guests. Travelers often arrive at hotels prior to the scheduled check-in time, which requires the guest to wait for a room to become available.

Even with present automated hotel management systems, the typical way in which rooms are prepared for new guests is that a listing is prepared for housekeeping in the form of a work order to clean a particular set of rooms which become available that day. These lists are typically printed from a central computer near or at the reception, and then distributed to supervisory housekeeping personnel who then have to assign rooms to be cleaned by the housekeepers. The housekeepers then signal completion of room cleaning by either reporting directly to their supervisor, or by telephoning the front desk indicating that a particular room has been cleaned.

If there are any changes to be made to the particular work order, this often requires a reprint of the work order, along with the extra time required to distribute the updated work order to various housekeeping personnel. Also, present systems have no efficient means by which particular rooms can be prioritized for cleaning based upon new guests arriving, nor do present systems have efficient means by which a guest can request at check in particular amenities to be stocked in the room such as extra towels, etc.

Therefore, while some hotel management systems may help to automate housekeeping services, these systems are still inadequate for allowing more efficient room check-ins and reducing the wait time for arriving guests.

U.S. Pat. No. 4,994,908 discloses an interactive room status/time information system. The system is used to manage hotel operations and specifically managing room statuses in a hotel. The status of a room for occupancy is determined by a two step procedure. Input from both a maid and an inspector must be received before a room has a ready for occupancy status. Data may be transmitted by a room terminal cable television system to a system manager location.

U.S. Pat. No. 3,675,204 discloses a system for monitoring the status of a plurality of terminals, and discloses the use of transmitting terminals, logic structure, and display structure. This system may be used to identify a hotel room and monitor its status. Information as to whether the room is vacant and not made up, vacant and made up, or occupied, is shown on a display. Information identifying a particular room and describing its status is transmitted from any transmitting terminal to the logic structure. Both a room clerk and housekeeper have a separate display. Information on the clerk's display is capable of being corrected or updated by new information from the transmitting terminals and by information placed into the system by the clerk and a cashier. The clerk may change the status of any room. The clerk's display also shows running counts of total rooms occupied, total rooms vacant, total number of rooms scheduled to be vacated, and total number of rooms reserved for new components.

While the invention disclosed in these references may be adequate for their intended purposes, one characteristic common to both of these references is that they require fairly complex circuitry, and are not capable of being incorporated within mobile units which can be carried by maids or other housecleaning personnel. Additionally, both of the references disclose wired systems which detract from their ability to be used in a more mobile environment.

It is therefore one object of the present invention to provide a system and method for managing hotel operations to include room cleaning services wherein the system and method makes use of a local wireless network allowing hotel personnel to carry individual mobile devices which are able to communicate wirelessly with a central computer which manages hotel operations.

It is yet another object of the invention to provide software within the mobile units which allows a number of functions to be handled by hotel personnel, and to instantaneously update information for exchange with the central computer monitored by hotel management. Another object of the invention is to provide a relatively simple, reliable, and inexpensive management system and method which makes use of wireless communications technology.

It is yet another object of the invention to provide a system and method which can be easily altered in terms of the specific functions which are capable through the system and method. The flexibility in the system and method is attributed to the software which can be modified for the particular desired application within the hotel operations.

Yet another object of the system and method of this invention is to provide individual housekeeping personnel with the ability to input information, respond to orders sent from the front desk, and to handle other housekeeping duties without having to go to a central control panel, or to utilize some other centrally located device away from their location at the time.

These and other advantages of the invention will become apparent from a review of the following description, taken in conjunction with the accompanying drawings.

SUMMARY OF THE INVENTION

In accordance with the invention, a system and method is provided for managing hotel operations, specifically including housekeeping operations. The system of the invention includes a central computer which may be located at the front desk or lobby. The central computer may be any well known or standard computer including a visual display in the form of a monitor, a central processing unit, and a data entry device such as a keyboard. Loaded in the central computer is host software for managing a particular hotel operation. A plurality of mobile or cart units are located with housekeeping personnel, and can be conveniently mounted to the housekeeping carts. The mobile units can be in the form of wireless personal digital assistants (PDAs) which are capable of wirelessly transmitting and receiving data. The mobile units can communicate with a base unit, via one or more transceivers. The transceivers are located at convenient locations which reduces the transmission and reception distances for the mobile unit so that the range of the system is increased. The function of the base unit is to interconnect the wireless PDAs with the central computer. The base unit is in the form of a server with a USB interface, and multi-port capability for servicing a number of intermediate transceivers. Conveniently, a standard router cable tray may be mounted in the base unit, and the various transceivers can simply plug directly into the tray. The base unit takes digital data from the central computer which is to be sent to the various mobile units, and converts the digital data into a format for wireless transmission by the transceivers. Similarly, the base unit communicates with the transceivers to receive the wireless data transmitted from the mobile units, and digitizes the data for subsequent wired transfer to the central computer.

Any number of wireless communication protocols may be used to communicate between the mobile units and the transceivers. One particularly advantageous wireless transmission standard that may be used is the IEEE 802.11 standard.

In operation, the mobile units act as data entry and reception ports. Housekeeping personnel are able to view data sent from the central computer, such as orders for cleaning rooms, and the mobile units are also used to transmit information back to the central computer to indicate the status of jobs completed, to request additional information for work to be completed, or to simply provide information to the central computer concerning other tasks or issues being handled by the housekeeping personnel.

In accordance with the method of the invention as it applies to a method of managing housekeeping functions within a hotel, the method includes inputting particular room requirements, processing the data, creating and transmitting floor orders for a particular work shift, and receiving and displaying floor orders on the mobile units as transmitted by the central computer. Housekeeping personnel at anytime during the process may provide feedback to the central computer. Once a particular room is serviced, the housekeeping person checks off room requirements and transmits the update back to the central computer. The central computer continually updates the status of the floor order based upon updates from the mobile units. The central computer is then able to transmit new orders, or to modify existing orders based upon the received updates. Also, at any point in time within the process, the central computer has the ability itself to update work orders and instructions based upon updated information received from other sources such as management or supervisory housekeeping personnel.

By providing an automated system for issuing instructions and providing feedback as to the status of work orders, great efficiencies can be realized within hotel operations. The mobile units allow housekeeping personnel with instant access to shift orders and other instructions, and also provides housekeeping personnel with the ability to immediately transmit updated information back to the central computer, to request further instructions, and to otherwise improve communications with the central computer which is receiving and processing hotel guests.

BRIEF DESCRIPTION OF THE DRAWINGS

FIG. 1 is s schematic diagram of the system of the current invention;

FIG. 2 is a perspective view illustrating a mobile or cart unit mounted to a housecleaning/maid cart;

FIG. 3 is an enlarged view of a mobile unit;

FIG. 4 is a fragmentary perspective view of a base unit;

FIG. 4A is a fragmentary perspective view of a transceiver showing additional details;

FIG. 5 is a representative plan view of a hotel floor illustrating the manner in which the mobile units and a transceiver may be incorporated within the particular hotel layout;

FIG. 6 is a simplified flow diagram illustrating the method of the invention; and FIGS. 7-20 illustrate representative screen shots or screen displays which incorporate functionality of software used in conjunction with the system of the invention.

DETAILED DESCRIPTION OF THE INVENTION

Figure 19:
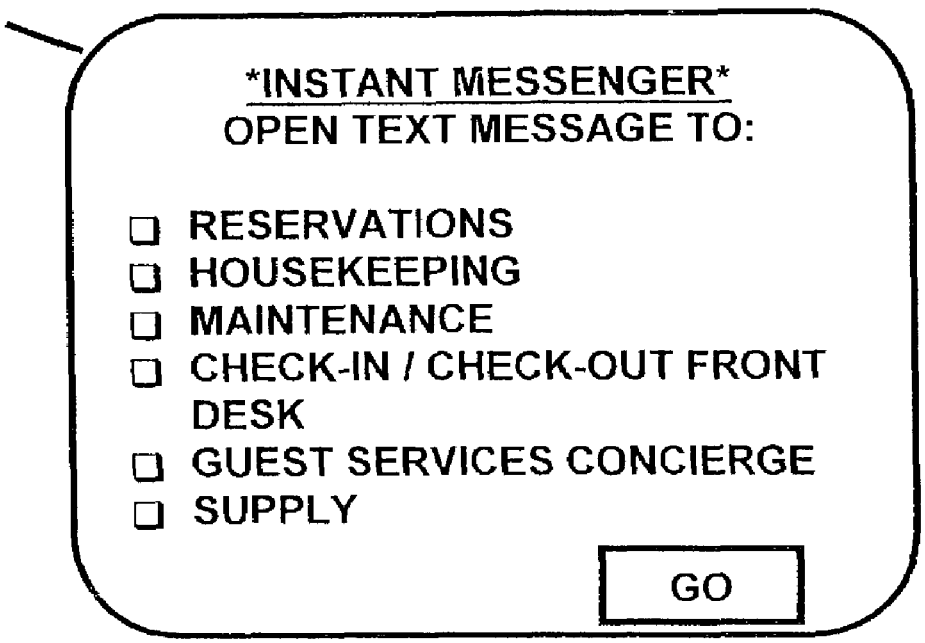

FIG. 1 illustrates the system of the present invention within a simplified schematic diagram. The system 10 comprises a central or main computer 12, illustrated as a common personnel computer 12 having a screen 14, a microprocessor 16, and an input device in the form of a keyboard 18. The central computer communicates with the base unit 20 as by bus 22. A plurality of cart units or mobile units 28 are interspersed throughout desired locations in the hotel. Depending upon the size of the hotel, there may be multiple mobile units on each floor, or there may be only a need for a single mobile unit. In the event that a number of mobile units are found on different floors or other geographically remote locations within the hotel, one or more transceivers 26 may be used to facilitate wireless communication between the mobile units 28 and the base unit 20. As shown in FIG. 1, six mobile units utilize a single transceiver which in turn transfers data to and from the base unit. Accordingly as shown, the base unit services two transceivers, and a total of twelve mobile units are employed. The base unit may handle a number of additional transceivers, each transceiver in turn able to handle multiple mobile units. Therefore, in a very simplified scheme of the present invention, a great number of mobile units may be deployed in various locations of the hotel.

FIG. 2 illustrates one manner in which a mobile unit 28 may be secured to a housekeeping cart 30. As shown, connecting hardware 31 may be provided in the form of a transverse bar 32 which mounts on the side rails 33 of the housekeeping cart. Those skilled in the art can envision multiple additional ways in which the cart unit may be secured to a housekeeping cart.

FIG. 3 is a simplified perspective view of a mobile unit in the form of a personal digital assistant (PDA). FIG. 3 illustrates a PDA having standard features to include a case 34, a resistive touch screen 36, and various control buttons 37 (such as on/off control, volume control, cursor control, etc.). An antenna 38 may be employed to enhance reception and transmission capabilities for the mobile unit. A top cover 40 may be incorporated to protect the resistive touch screen when not in use. Additionally, the top cover may have attached thereto instructions 50 for operation of the mobile unit, or for other functional purposes in achieving tasks in accordance with the method and system of this invention. As further shown in FIG. 3, the PDA may have a base 51 which has attached thereto a mounting bracket 41 for attachment to the bar 32.

FIG. 4 illustrates the base unit 20, and a pair of transceivers 26 which are connected to the base unit 20. Additional transceivers may be added to accommodate installations in larger hotels. Only a pair of transceivers is illustrated to simplify the diagram. The base unit includes a housing 42, a base 43, a main circuit board 44 mounted within the housing, the main circuit board having the circuitry which is able to receive and transmit data between the mobile units 28 and the central computer 12. A data cable 45 communicates with the computer 12. A router cable tray 46 may be mounted adjacent to the main circuit board 44. The cable tray 46 may also be referred to as the server port for receiving the connectors 49 from additional transceivers. Transceiver cables 48 interconnect connectors 49 to the transceivers 26. The transceiver cables may be of a desired length to position the transceivers at a location within the hotel so that the various mobile units are able to easily communicate with each transceiver.

As shown in the simplified schematic diagram of FIG. 4A, the transceiver includes a housing 52, a split FM transmitter/receiver board 53 containing transmitter circuitry 54 on one side, and receiver circuitry 55 on another side of the board 53. The board 53 receives data and sends data via the transceiver cable 48. The transceiver cable 48 also provides power to the transceiver unit. A simple coil antenna 59 can be incorporated within the casing or housing of the transceiver to enhance transmission and reception capabilities. Although the antenna coil 59 is shown as wrapping around a particular end of the transceiver housing, those skilled in the art can envision other ways in which an antenna may be incorporated within the transceiver.

FIG. 5 illustrates a representative floor plan for one floor of a hotel. As shown, this particular example of a floor plan shows three floor wings 56 having a number of rooms 58, and a central elevator area 57 in which a transceiver 26 may be centrally located for enhancing communication between the various mobile units 28 interspersed on the housekeeping carts. The transceiver 26 may be mounted external to a wall or ceiling, within a wall or ceiling, and may be accessible through a small door when internally mounted on the wall.

FIG. 6 illustrates the basic steps in the method of the invention. Although FIG. 6 illustrates these steps, it shall be understood that not all the steps shall be deemed critical and furthermore, as discussed below with respect to the software functionality, a number of additional steps in the method can be employed.

The method of the invention is set within a hotel scenario wherein hotel staff and management have the daily task of monitoring and servicing various guests who are arriving and who are leaving the hotel. One of the first requirements is to input particular room requirements as guests check into the hotel. This is shown at block 62. Room requirements may be input through the central computer 12 by hotel staff in the lobby/front desk area who greet guests for check in. The room requirements may include not only a particular type of room, but the various amenities which may be desired within the room, the location of the room within the hotel, and others. These room requirements are stored within the central computer and existing hotel management software can be used to process the data, shown at step 64. Once a preset number of rooms have been entered for new guests arriving, the central computer may create a floor order for delineating which rooms are to be vacated that day, and which are to be then revacated by arriving guests. The floor order includes instructions for particular rooms to be cleaned, the amenities to be placed in the room, and other instructions which may be provided by the guest when they check in. As shown at step 66, floor orders for a particular shift are then transmitted via the base unit 20, transceivers 26, and then to the appropriate mobile units 28. Each of the mobile units are addressed so that only shift orders for a particular floor corresponding to mobile units on the floor receive such shift orders. Additionally, each of the mobile units can be provided with functionality such that individual operators may view shift orders for other locations within the hotel.

As shown in block 68, the mobile units receive and display the particular floor order that has been generated. The double outline for block 68, as well as the other double outline blocks in FIG. 6, indicate a functional step within the method occurring at mobile unit. In block 70, the housekeeper is then able to service the particular room on the order. Once all tasks are completed for a particular room, the housekeeper then checks off the requirements on the screen of the mobile unit and the housekeeper may then transmit this completed task back to the central computer. Preferably, the screen is a resistive touch screen that allows the housekeeper to simply touch the desired area on the screen to control the mobile unit. The central computer receives the updated data, processes the data and transmits an updated floor order, or issues other instructions which are commensurate with the data which has been received from the particular mobile unit. This is shown at block 76. At block 78, then a decision point is reached whether there are other rooms on the shift order. If there are other rooms to service on the order, then the housekeeper as shown at block 80 services the next room on the order. If no additional tasks are required, then the floor order is finished as shown at block 82.

FIGS. 7-20 illustrate various screen shots for sample screens which may be viewed on the mobile units or on the central computer. As discussed above, touch screen capability may be provided on the mobile unit so that operators of the particular mobile units can enter commands or data. FIGS. 7 through 11 are examples of screens which may be viewed on the central computer. Beginning first with FIG. 7, screen 84 prompts the user as to the task to be completed such as assigning available rooms, training of new users, changing languages, or performing inventory management. The software contemplated within the invention would have automatic language change capability wherein users could choose from various languages. A set of training screens could also be provided to train new users. These training screens would guide the new user through a set of sample screens, explaining the purpose of each and how each screen allows control of the particular hotel function.

Now beginning with a discussion of the system and method of the invention, a user would first designate or prompt the "assign available rooms" block which in turn would result in the computer showing screen 86 at FIG. 8. The user would then choose the particular type of room which has been requested by the hotel guest. This could be done by simply designating the desired choice, and then designating the box for completing the room assignment shown as the box "done assigning rooms". The next screen which could be displayed is one which includes the particular amenities which the hotel guests would like to have stocked in the room. This is shown at screen 88. Additionally, there could be an entry for the time in which the hotel guests would like to check in, shown as the "time required" portion in screen 88. The user would click on the desired choices for the particular amenities, and also the time required for the room to be available for the guest. Of course, in addition to the amenity options shown on screen 88, many others could be provided depending upon the type of hotel, season, etc.

As shown in screen 90, the next time the user would view the available rooms for a subsequent guest, the previously selected room (Room 3002) would not be shown, and the guests would then, of course, be able to choose only from the remaining rooms. The user would repeat filling out the information in the previous screens for a number of guests. At a predetermined time, or when a predetermined number of guests have checked in, then a shift order could be created which delineates the particular rooms to be prepared, the particular amenities desired, as well as the times required for check in. Of course, the user could telephonically receive the instructions from the various guests well prior to the guests actually arriving to the hotel. Therefore, the shift order might be created days in advance of the actual day in which the shift order needed to be completed.

As shown in screen 92, the user could then view the particular shift order, verify its accurateness, or modify the shift order as necessary by reentering data in the shift order. Then, the user could click on the box in the lower left hand corner which would automatically result in the shift order being transmitted by the central computer to the particular mobile units which are to respond to the particular shift order. As shown in screen 92, there are three rooms which have been issued to a particular cart unit, along with the times required, the special requirements for stocking each of the rooms, and an additional special instruction of not cleaning the Room 3018. Room 3018 might be a room already occupied by a guest who is not departing, and simply wants additional amenities to be provided for the day.

Screen 94 (FIG. 12) illustrates a sample screen which could be viewed by a housekeeping employee on a respective mobile unit, corresponding to a room to be serviced with the existing shift order. As shown, the Room 3002 is required to be prepared no later than 12:10 p.m., and the amenities for the room include extra soap/shampoo, extra towels, and an iron. The employee would complete the tasks for the particular room and would designate/click on the boxes indicating the items had been stocked. The employee would finally designate the "Room Ready" box which would transmit indication of completion of the work for that particular room back to the central computer wherein the shift order would be automatically updated at the central computer to reflect completion of that particular room. As also shown on the screen 94, a present time can be displayed in order for the housekeeping employee to conveniently compare how much time is left before the room is required to be completed. In addition to clicking on the "Room Ready" box, the housekeeping employee would also click on the other boxes to positively signify that the particular tasks have been completed, or items have been stocked.

FIG. 13 illustrates another example of an order which could appear on a particular cart unit, corresponding to yet another room which needed to be serviced according to the shift order. As shown in screen 96, the next room to be serviced is Room 3011, with a required time of 12:40 p.m., and the special requirements of having extra soap/shampoo, and extra towels. As with the screen 94, the operator would also simply click on the boxes in screen 96 to include the Room Ready box, thereby indicating completion of the room and transmission of the information back to the central computer.

FIG. 14 illustrates another example of a screen which can appear on the home unit, relating to the performance of inventory management. Referring first back to FIG. 7, one of the other options under the main screen or menu is to perform inventory management. A user could click on this option which will then present the screen shown at FIG. 14. One purpose of inventory management in the present invention would be to track the amount of inventory consumed over a particular period of time. Inventory would include consumed items and stocked items such as soap, shampoo, towels, and other items which are stocked in a room based upon the content of shift orders created over a designated time period. The purpose of conducting inventory management has many useful purposes. As those experienced in the hotel industry understand, unaccounted consumption of inventory materials unnecessarily adds to the cost of operating the hotel. By tracking inventory materials either by floor, shift, or by individual cart units, supervisory personnel can make more informed decisions as to better management of the inventory materials, as well as reducing or eliminating abuses of the system to include pilfering by employees, or other problems by employees who are improperly completing shift orders by either overstocking or understocking particular rooms.

The software within the central computer makes use of a database which performs the function of adding amounts of materials used or consumed over a selected period of time for each cart unit, shift, and/or floor. As shown in FIG. 14, screen 98 presents the user the option to choose a reporting period for a specific time period, and also to create an inventory report by floor, or by a particular cart unit. Once the operator checks the desired box(es), the user would simply click on the "go" button which will then bring up either the screen 100 shown at FIG. 15, or the screen 102 shown at FIG. 16. The screen 100 at FIG. 15 is shown in the event the user chooses to access the inventory report by floor. Screen 102 would be shown if the user selected the option for accessing the report by a particular cart unit. For screen 100, the user would then input the floor number in the upper box, or if multiple floors reports were desired, would enter the exact floors in the lower box. The user would then simply click on the "go" button which results in the data being retrieved from the database in the central computer. In the event the operator chooses to access the reports by cart unit, screen 102 at FIG. 16 simply instructs the user to input the selected cart units. As discussed above, each cart unit can be identified by a particular number or identifier such as a serial number. After the user entered the information regarding the desired cart unit, the user would then also press the "go" button thereby accessing the information from the database in the central computer. Finally, the user would have the option of either printing a hard copy of the report, or forwarding the report electronically as by email. Accordingly, screen 104 at FIG. 17 provides the user this option by either pressing the "print" or "email" buttons.

Yet another additional feature of the present invention is the ability for hotel personnel to instantaneously access the status of any particular room without having to refer to a particular shift order, or contacting the front desk or supervisor who may be in charge of a particular floor. Now referring to FIG. 18, screen 106 is shown. A hotel employee who has access to a cart unit or the main computer could simply request the status of a room by accessing this screen, and then typing the room number in the blank for which a status is desired. Then, this message would be transmitted to the central computer, and the central computer would respond by providing information as to the then updated status of the room. In the example of FIG. 18, three statuses could be shown such as room "scheduled for cleaning," room "currently being cleaned," or room "completed-ready for occupancy." Accordingly, after the user had entered the room number and clicked on the go button, one of these three statuses would appear as highlighted or otherwise annotated as being the particular status for the room at that time. The three statuses provided in FIG. 18 are easily tracked by the system of the present invention. For the status "scheduled for cleaning," this status would appear if no hotel employee had begun working on a particular shift order, yet the room does at least appear in a shift order to be completed that day. For the status "currently being cleaned," this status is easily tracked because once a user accesses a particular shift order and begins transmitting information back to the central computer as to completion of the work on the room, this would signal to the central computer that the room had been in the process of being cleaned, yet not completed. Of course, the "completed" status is also easily tracked by the central computer because for each shift order completed by a worker, indication of such completion is always sent back to the central computer.

Figure 20:
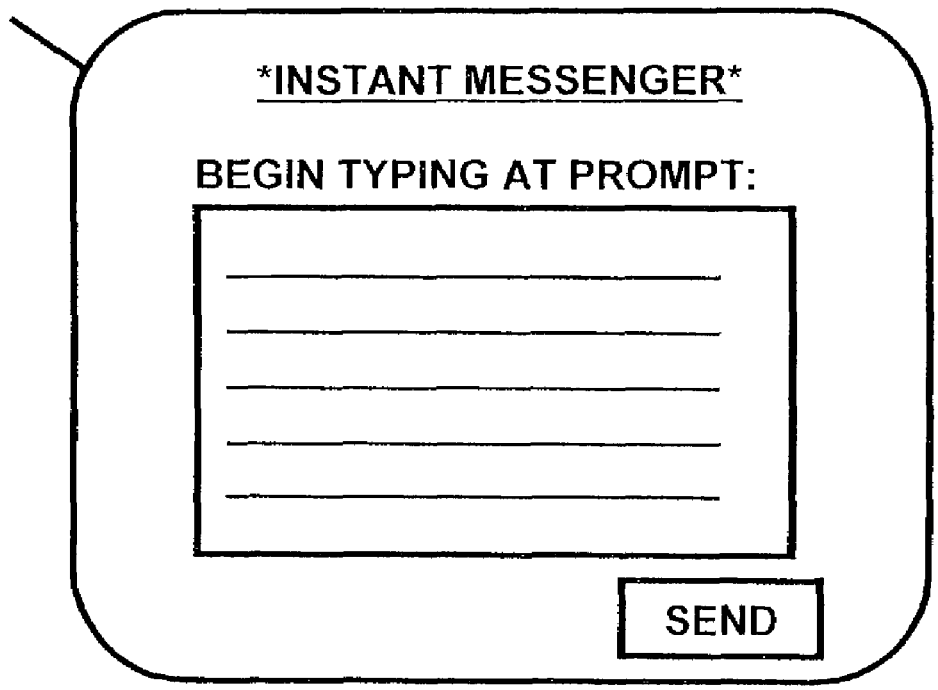

Yet another feature which may be incorporated within the method and system of the current invention is email communications between different hotel staff groups. Accordingly, screen 108 at FIG. 19 can also be provided which is a communication screen allowing users to send email messages through the cart units. As shown in the FIG. 19, a user could choose from a list of addresses to include reservations, house keeping, maintenance, check-in/check-out-front desk, guest services/concierge, or supply. Once the user clicked on the appropriate choice, then as shown in FIG. 20, screen 110 would appear which would allow the user to then type in a message to the addressee. The message could then be sent by clicking on the send button. FIGS. 19 and 20 are intended to illustrate an email or electronic messaging system which allows users of the particular cart units to communicate with hotel staff.

The mobile units can be powered either by a rechargeable battery (not shown), or could be plugged into a conventional 110 volt outlet. Because the mobile units use such little power, the most preferred manner would simply provide the rechargeable battery. Each of the maid carts could be equipped with their own battery recharging units, thereby simplifying battery recharging for the mobile units. For example, when a particular shift ends and a particular housekeeping cart is no longer used, the mobile unit may then be recharged.

In order to control activation of each of the mobile units, each mobile unit would be activated only by its corresponding activation code which is transmitted by the central computer. Thus, control could be exercised over each particular mobile unit which would be assigned to handle particular shifts for a designated day, based on availability of housekeeping personnel, and other factors. This activation code can also be used to provide a one to one correspondence for the particular cart unit which is to be designated work for a particular set of rooms or for a particular floor in the hotel. This activation code can simply be in the form of a wirelessly transmitted bit stream, which will translate into a group of preset alphanumeric characters. Each shift order generated would include the activation codes to assign specific rooms and tasks to each designated mobile unit To further describe the basic software loaded within the central computer, the software may simply be compatible with any Windows operating system or Windows NT operating system. The software could be accessed initially by a desk top icon placed on the central computer running the software. The software would guide the user through the sets of screens (a graphical user interface—GUI) to place shift orders and to achieve other functions. The special preferences which can be added to the floor order from front desk personnel running the software thus allows each room to be tailored to the guest's needs. Once floor orders have been arranged for hotel rooms on a particular wing or area of the hotel, the software sorts the orders by priority, and assigns them to the specific mobile units which are to be activated for the particular shift. Regardless of the order of the rooms and floors which are assigned by front desk personnel, the mobile unit assignments are made to best support the number of rooms to be prepared in the times designated. For example, the software would automatically cross level room orders for the employed mobile units such that each mobile unit would have room orders to be completed, the earliest rooms to be completed receiving the highest priority by appearing first on the mobile unit screens.

As mentioned above, the particular wireless protocol which may be used could include a direct sequencing spectrum (DSS) protocol in accordance with an IEEE 802.11 standard for wireless local area networks. As understood by those skilled in the art, DSS uses a radio transmitter to spread data packets over a fixed range of the frequency band, and assures up to an 11 MBPS high transmission rate for the wireless network. Each particular mobile unit would have its own identifying address. Each of the transceivers used would have capability to receive multiple transmissions from their corresponding mobile units, as well as to transmit data to the respective mobile units having their corresponding addresses. Some commercial examples of PDAs which can be used as mobile units of the invention include the Palm VII™, the Compaq® iPac™ with wireless modem, and the Handspring® Visor® with wireless modem. Each of these mobile units could be programmed with the host software of the system for communicating with the central computer via the transceivers and base unit.

One example of a transceiver which may be used in accordance with the present invention includes a Lynksys systems transceiver. The base unit could simply be a commercially available network router.

From the foregoing, it is apparent that there are many advantages to the current invention. Reliable wireless communications can be achieved with the system which enhances efficient communication between housekeeping personnel and front desk personnel. This enhanced communication results in more efficient work for the housekeeping staff to handle shift orders which in turn, greatly improves overall hotel management and the ability to satisfy hotel guests. The method and system herein also provides great flexibility for hotel management to better tailor their housekeeping staff to respond to various and changing needs of hotel guests. Clear, concise instructions can be provided to the housekeeping staff nearly simultaneously with the particular requests made by a hotel guest. By tailoring and prioritizing shift orders according to hotel guests needs, the hotel will ultimately be able to better provide better services for their guests.

This invention has been described in detail with respect to a preferred embodiment thereof; however, it shall be understood that various other modifications may be made within the spirit and scope of the invention.

What is claimed is:

1. A method of managing hotel room servicing operations, said method comprising the steps of:
   (a) providing a plurality of housekeeping carts each including:
      (1) a mobile computing means including a first data storage means for storing data and a first microprocessor in the mobile computing means;
      (2) software means loaded in the mobile computing means for providing desired functions for manipulating and organizing the data, wherein the software means comprises a graphical user interface screen showing: available bed options, a list of available amenities, a time required for service completion, and a room service queue, and a screen for signifying completion of tasks on shift orders;
   (b) a central computing means including a second data storage means for storing data in a second microprocessor in the central computer means, the software means loaded in the central computing means for providing desired functions for manipulating and organizing the data, the software means further comprising a graphical user interface;

(c) inputting data into the central computing means reflective of orders for rooms of the hotel said orders comprising a guest's preference for room amenities, a desired check-in time and a room type preference;

(d) the software means prioritizing the orders for rooms of the hotel and creating shift orders, based on the orders for rooms of the hotel, wherein the orders for rooms of the hotel are prioritized by additional updates being periodically transmitted from the central computing means to the mobile computing means and wherein the prioritizing is reflective of additional tasks to be completed, said additional tasks being further prioritized within the shift orders;

(e) when a preset number of orders for rooms of the hotel have been inputted into the central computing means wirelessly transmitting the shift orders to the plurality of mobile computing means designating selected mobile units to complete specific tasks on the shift orders wherein the shift orders comprise a room identification, time required and an amenity requirement;

(f) housekeeping personnel associated with one of the plurality of housekeeping carts performing at least one task on the shift orders transmitted to the mobile computing means interconnected to their associated housekeeping carts and signifying the completion of the task on the shift order using the mobile computer means;

(g) wirelessly transmitting completion of the task by one of the mobile computing means;

(h) updating the shift orders based on completion of the task;

(i) housekeeping personnel performing the next task on the shift order, and wirelessly transmitting completion of the next task by one of the mobile computing means;

(j) further updating the shift orders based upon completion of the said next task;

(k) repeating steps (i) and (j) until completion of the shift orders; and (l) transmitting intermediate updated information from the mobile computing means to the central computing means reflective of information generated by housekeeping personnel as to the status of the shift orders being worked on.

2. A method, as claimed in claim 1, further comprising the steps of:

sorting data in the data storage means reflective of the types and mounts of amenities stocked by completion of the shift order over a preset time period;

storing the data in the data storage means reflective of the sorted data; and generating a report indicative of the amount and type of consumed amenities over a particular time period thereby achieving inventory management.

3. A method, as claimed in claim 1, further comprising the step of:

transmitting information in the form of email type of communications from the mobile units to the computing means whereby the computing means then forwards the email messages to an addressed hotel personnel or a hotel staff group.

4. A method of managing room servicing operations within a hotel, said method comprising the steps of:

(a) providing a plurality of housekeeping carts, each cart including:

(1) a mobile computing means including data storage means for storing data and a first microprocessor in the mobile computing means;

(2) software means loaded in the mobile computing means for providing desired functions for manipulating and organizing the data, wherein the software means comprises a graphical user interface screen showing: available bed options, a list of available amenities, a time required for service completion, and a room service queue, and a screen for signifying completion of tasks on shift orders;

(b) providing a central computing means for manipulating and storing data;

(c) providing the software means also loaded in the central computing means for providing desired functionality to manipulate and organize the data;

(d) inputting data into the central computing means reflective of orders for rooms of the hotel, the orders including instructions concerning a guest's preference for room amenities, a desired check-in time, and a room type preference;

(e) using said software means to prioritize the orders for a shift, based on the orders for rooms of the hotel, and creating a shift order reflective of tasks to be completed for designated rooms to be serviced wherein the orders for rooms of the hotel are prioritized by additional updates being periodically transmitted from the central computing means to the mobile computing means and wherein the prioritizing is reflective of additional tasks to be completed, said additional tasks being further prioritized within the shift orders;

(f) when a preset number of order for rooms of the hotel have been inputted into the central computing means, wirelessly transmitting the shift order to at least one of a plurality of mobile computing means by a base unit communicating with said mobile computing means, said mobile computing means each having a means for receiving the shift order and means for displaying the shift order, said shift order designating tasks to be completed by one or more housekeeping personnel attending to pre-selected mobile computing means, at least one graphical user interface screen of at least one of the plurality of mobile computing means depicting a room identification, time required, and an amenity requirement, wherein each of said mobile computing means is interconnected to a corresponding housekeeping cart of the plurality of housekeeping carts;

(g) housekeeping personnel associated with one of the plurality of housekeeping carts performing at least one task on the shift order;

(h) using one of the mobile computing means to wirelessly transmit indication of completion of the task, wherein the orders for rooms of the hotel are prioritized by additional updates being periodically transmitted from the central computing means to the mobile computing means and wherein the prioritizing is reflective of additional tasks to be completed, said additional tasks being further prioritized within the shift orders;

(i) updating the shift order by the central computing means based upon the transmitted completion of the task from the mobile computing means;

(j) housekeeping personnel performing the next task on the shift order, and using one of the mobile computing means to wirelessly transmit indication of completion of said next task;

(k) updating the shift order by the central computing means based upon the transmitted completion of the said next task by the mobile computing means; and (l) repeating steps (j) and (k) to complete the shift order; and (m) transmitting intermediate updated information from the mobile computing means to the central computing means reflective of information generated by housekeeping personnel as to the status of the shift orders being worked on.

5. A method, as claimed in claim 4, wherein:
said base unit includes a plurality of transceivers selectively located within the hotel to reduce transmission and reception distances of the mobile units.

6. A method, as claimed in claim 4, wherein:
indication of completion of a task in said second using step is achieved by a person manipulating an input device of the corresponding mobile unit.

7. A method, as claimed in claim 4, wherein:
said shift order is displayed on a screen of the mobile unit in time order sequence so that rooms required to be prepared first are displayed first on the screen.

8. A method, as claimed in claim 4, further comprising the steps of:
sorting data in the data storage means reflective of the types and mounts of amenities stocked by completion of the shift order over a preset time period;
storing the data in the data storage means reflective of the sorted data; and
generating a report indicative of the amount and type of consumed amenities over a particular time period thereby achieving inventory management.

9. A method, as claimed in claim 4, further comprising the step of:
transmitting information in the form of email type of communications from the mobile units to the computing means whereby the computing means then forwards the email messages to an addressed hotel personnel or a hotel staff group.

10. A system for managing hotel operations to include housekeeping tasks, said system comprising:
a plurality of housekeeping carts, each cart including;
(1) a mobile computing means including a first data storage means for storing data and a first microprocessor in the mobile computing means;
(2) software means loaded in the mobile computing means for providing desired functions for manipulating and organizing the data, wherein the software means comprises a graphical user interface screen showing: available bed options, a list of available amenities, a time required for service completion, and a room service queue, and a screen for signifying completion of tasks on shift orders;
a central computer means including a microprocessor, a data entry device, and second data storage means for storing data;
the software means also for providing functionality to manipulate said data by said microprocessor to include organizing said data in shift orders reflective of tasks to be completed by housekeeping personnel;
the central computing means receiving data reflective of orders for rooms of the hotel, the orders including instructions concerning a guest's preference for room amenities, a desired check-in time, and a room type preference;
the software means prioritizing the orders for a shift, based on the orders for rooms of the hotel and creating a shift order reflective of tasks to be completed for designated rooms to be serviced;
wherein the software means prioritizes the orders for rooms of the hotel based on additional updates periodically transmitted from the central computing means to the mobile computing means and wherein the prioritizing is reflective of additional tasks to be completed, said additional tasks being further prioritized within the shift orders;
a base unit communicating with said central computer means for exchanging data with the central computer means;
at least one transceiver communicating with the base unit for wirelessly transmitting and receiving data;
the mobile computing means communicating wirelessly with said at least one transceiver, each said mobile computing means having means for wirelessly transmitting and receiving data including the shift orders, when a preset number of order for rooms of the hotel have been inputted into the central computing means, wirelessly transmitting the shift order to at least one of a plurality of mobile computing means by a base unit communicating with said mobile computing means, said mobile computing means each having a means for receiving the shift order and means for displaying the shift order, said shift order designating tasks to be completed by one or more housekeeping personnel attending to pre-selected mobile computing means;
each said mobile computing means further including a screen display and a means for signifying completion of tasks on the shift orders, at least one graphical user interface screen of at least one of the mobile computing means depicting a room identification, time required, and an amenity requirement, wherein at least one mobile computing means is interconnected to a housekeeping cart of the plurality of housekeeping carts; and
wherein said mobile computing means receive instructions from the central computer means via said at least one transceiver and base unit reflective of specific tasks be completed on the shift order, the mobile computing means periodically transmitting data back to the central computer means via said transceiver and base unit reflective of tasks completed and wherein the mobile computing means transmits intermediate updated information to the central computing means reflective of information generated by housekeeping personnel as to the status of the shift orders being worked on; and
the central computing means updating the shift orders based upon the transmitted intermediate updated information.

11. A system, as claimed in claim 10, wherein:
said base unit receives the shift orders from the computer means in digital data format, and said base unit converts the digital data format to a wireless protocol format.

12. A system, as claimed in claim 10, wherein:
said base unit receives data from the mobile units in a wireless protocol format and converts the data into a digital data format for transmission to the computer means.

13. A system, as claimed in claim 10, wherein:
said mobile unit includes a personal digital assistant including second software means loaded therein for providing functionality to manipulate data received from the computer means, and for transmitting data from the mobile unit to the computer means.

* * * * *